(12) United States Patent
Bergmann et al.

(10) Patent No.: US 6,253,005 B1
(45) Date of Patent: Jun. 26, 2001

(54) APPARATUS AND METHOD FOR COMPENSATING FOR MISALIGNMENT IN REFLECTIVE PACKAGES

(75) Inventors: Ernest Eisenhardt Bergmann, Lehigh, PA (US); Gustav Edward Derkits, Jr., New Providence, NJ (US)

(73) Assignee: Agere Systems Optoelectronics Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/329,708

(22) Filed: Jun. 10, 1999

(51) Int. Cl.[7] ................................................ G02B 6/32
(52) U.S. Cl. ................................ 385/33; 385/27; 385/34
(58) Field of Search ............................... 385/33, 31, 34, 385/35, 27

(56) References Cited

U.S. PATENT DOCUMENTS

| | | | |
|---|---|---|---|
| 4,364,639 | * 12/1982 | Sinclair et al. | 385/33 |
| 5,143,435 | * 9/1992 | Kikuchi | 362/32 |
| 5,703,992 | * 12/1997 | Bergmann | 385/139 |
| 5,790,314 | * 8/1998 | Duck et al. | 359/654 |
| 5,991,058 | * 11/1999 | Feuer et al. | 359/125 |

\* cited by examiner

*Primary Examiner*—Rodney Bovernick
*Assistant Examiner*—Ellen E. Kim
(74) *Attorney, Agent, or Firm*—Cohen, Pontani, Lieberman & Pavne (57) ABSTRACT

An optical package includes a dual fiber termination having a first optical fiber end portion and a second optical fiber end portion. A collimating lens, spaced from the dual fiber termination, is configured for collimating and transmitting an optical signal emitted from the first optical fiber end portion and for converging a reflected optical signal onto the second optical fiber end portion. A mirror spaced from the collimating lens and having a reflective layer is configured and oriented for reflecting at least a portion of the emitted optical signal from the collimating lens back toward the collimating along a propagation path. A compensation lens is disposed between the collimating lens and the reflective layer of the mirror for correcting optical misalignment between the dual fiber termination and the collimating lens. The position of the compensation lens is movably adjusted in a direction transverse to the optical axis of the collimating lens and is configured for deflecting the emitted optical signal from the collimating lens to thereby modify the propagation path of the reflected optical signal such that the second optical fiber end portion receives the reflected optical signal without significant alignment-related optical loss.

22 Claims, 6 Drawing Sheets

APPARATUS AND METHOD FOR COMPENSATING FOR MISALIGNMENT IN REFLECTIVE PACKAGES

BACKGROUND OF THE INVENTION

1. Field of the Invention

The present invention relates to fiber optics and, more particularly, to an apparatus and method for compensating for shift in alignment of optical components after assembly of the optical package.

2. Description of the Related Art

The current explosion in the use of fiber optic technology in telecommunications and data processing is well documented. With this phenomenal technological growth, a wide variety of optical devices have become available. Interconnecting these optical devices, however, has remained a daunting task as such devices require extremely precise mechanical alignment. This problem is most severe for reflective applications, since the error in alignment cannot be greater than a micron.

One available form of optical packaging requires the mounting of optical components in separate metal holders. For example, fiber terminations are mounted in one metal holder and a focusing device such, for example, as Graded Index (GRIN) or conventional lens is mounted in another metal holder; additional optical components are mounted in still further metal holders. The optical components in these different metal holders are optically aligned by sliding the metal holders relative to each other. When proper alignment is achieved, the holders are typically laser-welded together so as to fix the alignment positions of these optical components.

Figure 1:
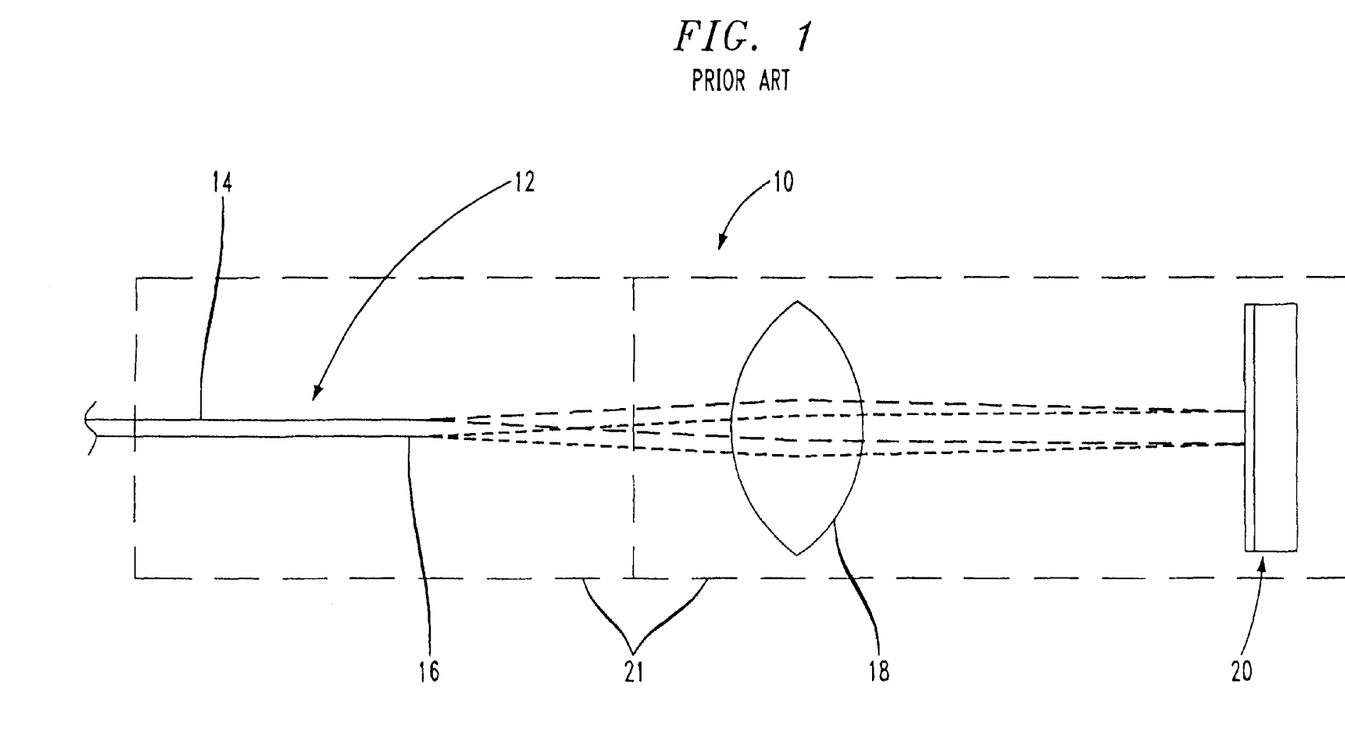
FIG. 1 depicts a prior art optical package.

FIG. 1 shows a typical prior art optical package 10 for reflective applications. The package has a dual fiber termination 12 disposed at one end of the package at which the upper fiber 14 is configured as an input to the package and the lower fiber 16 is configured as an output. As shown, the optical signal emitted from the upper fiber 14 is collimated by a double convex lens 18 and directed onto a mirror 20. The mirror 20 reflects the collimated beam back toward the convex lens 18 which then converges the collimated beam onto the lower fiber 16.

The termination 12, and collimating lens 18 and mirror 20 are disposed in separate metal holders 21; the metal holders 21 are laser welded together once the optical components have been optically aligned. Due to mechanical forces arising from the welding process, these optical components, even if perfectly aligned prior to welding, will often experience "post-weld shift," i.e. changes in the relative positions of the metal holders, and thus the components, after welding. Such "post-weld shift" may be in the order of 1 $\mu$M or more, depending on various parameters such as the coefficients of thermal expansion of the metal holders and the geometry and arrangement of the weld zones. Although post-weld shift may be acceptable for transmission applications, the shift could be extremely detrimental in reflective applications as it causes unacceptably high optical losses.

For example, a shift of 1 $\mu$M between the dual fiber termination 12 and the center of lens 18 in the vertical direction in FIG. 1 will cause the reflected beam to converge at a point 1 $\mu$M below the original position of the lower fiber 16. Since the lower fiber 16 has been vertically displaced 1 $\mu$M from its original position, the reflected beam will miss the intended target, i.e. the center of the lower fiber 16, by as much as 2 $\mu$M. Such misalignment will seriously degrade the performance of the optical package and thus render it unfit for use.

Thus, there is a critical need for an optical package having the ability to compensate for post-weld shifts of optical components.

SUMMARY OF THE INVENTION

It is accordingly an object of the present invention to provide an apparatus and method for compensating for shift in the alignment of optical components in an optical package.

A particular advantage of the present invention is that post-assembly shifts in alignment between a fiber termination and a collimating lens can be adjusted by a compensation lens disposed between the collimating lens and a reflecting mirror.

In accordance with an embodiment of the invention, an optical package includes a dual fiber termination having a first optical fiber end portion and a second optical fiber end portion. A collimating lens, spaced from the dual fiber termination, is configured for collimating and transmitting an optical signal from the first optical fiber end portion and for converging another optical signal onto the second optical fiber end portion. A mirror spaced from the collimating lens and having a reflective layer is configured and oriented for reflecting at least a portion of the optical signal from the collimating lens toward the second optical fiber end portion along a propagation path. A compensation lens is disposed between the collimating lens and the reflective layer of the mirror for correcting optical misalignment between the dual fiber termination and the collimating lens. The compensation lens is selectively movable in a direction transverse to the optical axis of the collimating lens and is configured for deflecting the optical signal from the collimating lens so that selective transverse movement of the compensation lens adjusts the propagation path of the reflected optical signal to assure that the second optical fiber end portion receives the reflected optical signal without significant optical loss.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE CURRENTLY PREFERRED EMBODIMENTS

Figure 2:
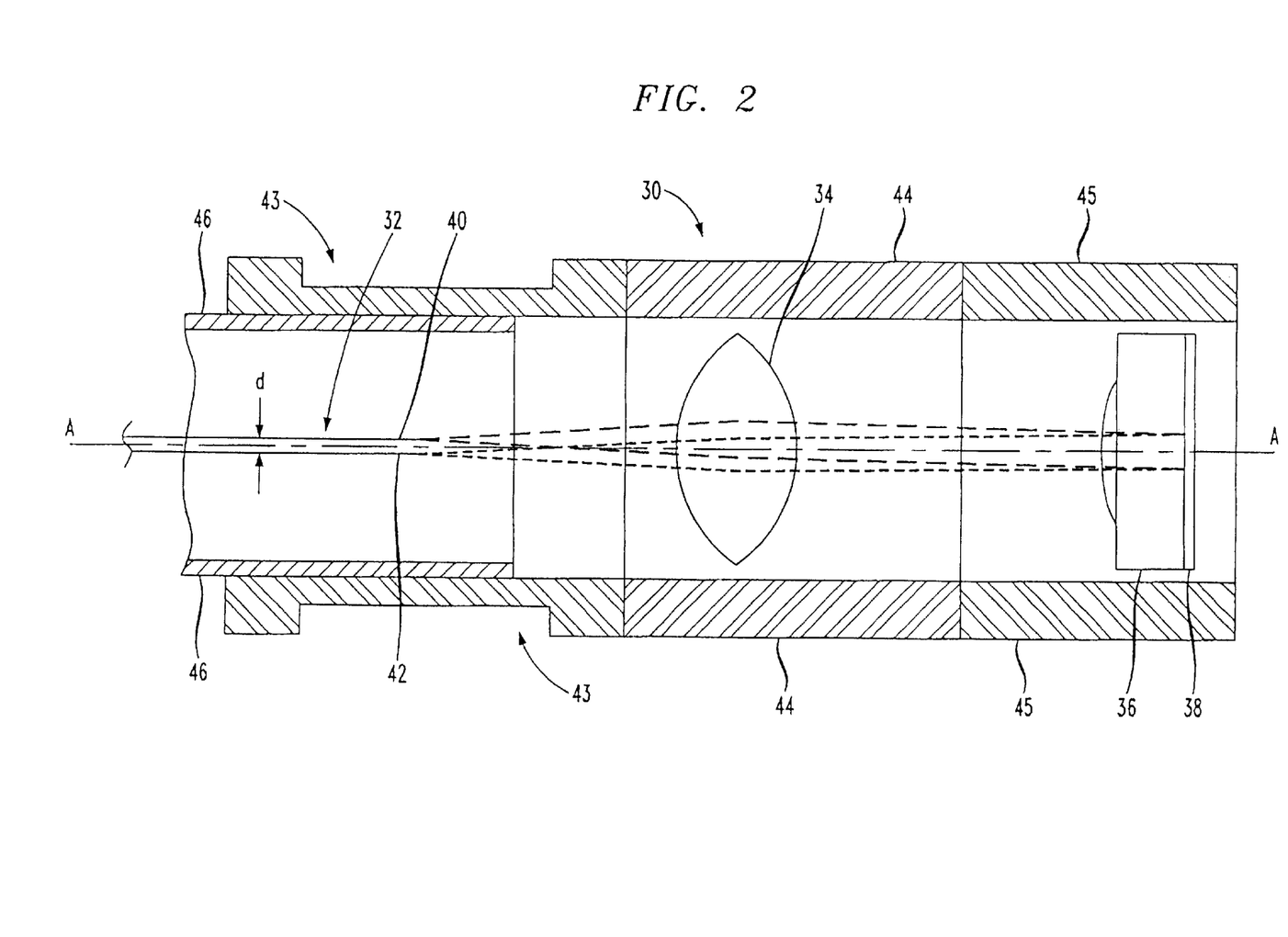
FIG. 2 schematically illustrates one embodiment of an optical package incorporating a compensation lens in accordance with the present invention.

An exemplary embodiment of an optical package 30 constructed in accordance with the present invention is shown in FIG. 2. The optical package 30 includes a dual fiber termination 32, a collimating lens 34, a compensating lens 36, and a mirror 38 all disposed in optical communication with each other. As is known and common in the art, each of the arrangements 32, 34, 36, 38 of the optical package 30 are disposed in a separate metal holder, these metal holders being laser welded or otherwise nonreleasably secured to one another to form the package 30. The dual fiber termination 32 has a first fiber end portion 40 and a second fiber end portion 42 separated by a center-to-center distance d. Although the optical fibers are illustrated as extending parallel to each other, it is contemplated that they may also be arranged in a non-parallel relationship so long as the optical signals emerge from or enter the fiber end portions 40, 42 in substantially parallel relation at a distance or spacing d. Arranged in the aforementioned manner, the optical package 30 receives an optical signal from one fiber end portion and outputs at least a portion of the optical signal through the other fiber end portion.

The collimating lens 34 has an optical axis A-A and may be configured as, for example, a double convex lens, a GRIN lens, a plano-convex aspheric lens, or a lens having at least one convex optical surface. The lens 34 is disposed such that its optical axis A-A extends and lies substantially equidistant between the fiber end portions, i.e. at a distance d/2 from the centers of each of the first and second end portions 40, 42. In addition, the lens 34 and fiber end portions 40, 42 are positioned at an axial distance substantially equal to the focal length of the collimating lens 34 so that optical signals diverging from the transmitting fiber end portion, as for example the first end portion 40, will be substantially collimated by the lens 34. As will become apparent from this disclosure, the lens 34 also operatively converges another signal such, for example, as a reflected signal from the mirror 38 onto the other or receiving fiber end portion (e.g. end portion 42).

The mirror 38 may, for example, take the form of an ordinary mirror having a reflective layer which reflects the entire incident beam back toward the collimating lens 34. Alternatively, and as a function of the particular optical application, the reflective layer may be constructed to reflect a substantial portion of the incident beam and to transmit a small portion of the beam to, for example, a photodetector (not shown) located downstream of the mirror 38 or to transmit light from another optical source (not shown) disposed behind the mirror 38. The mirror 38 may optionally be a dichroic mirror which reflects a select wavelength or range of wavelengths while transmitting the remaining wavelengths therethrough.

According to a particularly advantageous aspect of the invention, the compensation lens 36, which is disposed between the collimating lens 34 and the mirror 38, may be integrally formed with the mirror 38 or, in the alternative, constructed as a separate and distinct unit from mirror 38. In either case, the compensation lens 36 operatively enables redirection of the reflected beam onto the other (i.e., the receiving) fiber end portion of the dual fiber termination 32, despite the fact that the relative positions of the termination 32 and collimating lens 34 have already been fixed. (e.g., by welding together of the metal holders 44) Preferably, the compensation lens 36 is so shaped that selective positioning of the compensation lens 36 in a direction substantially transverse to the optical axis A-A of the collimating lens 34 causes the collimated beam from the collimating lens 34 to deflect angularly to thereby slightly vary the incident angle of the collimated beam at the mirror 38 by, for example, about a milliradian, such that the reflected beam reflected by the mirror 38 can be manipulated by a user to converge onto the other or receiving fiber end portion with little or no alignment-related losses. The compensation lens 36 may, for example, be a plano-convex lens (as shown in FIG. 2), a plano-concave lens, a wedge lens, or any suitably shaped lens as will be apparent to an ordinary artisan based on the disclosure herein. In any event, the additional adjustment in beam alignment provided by the compensation lens 36 is particularly desirable when the relative positions of the dual fiber termination 32 and collimating lens 34 have already been fixed, as by welding of the holders 44, so that their alignment otherwise falls short of the requisite level of reflected signal incident on the receiving fiber end.

Preferably, the compensation lens 36 has a focal length that is much longer than that of the collimating lens 34 since the anticipated requisite correction by the compensating lens is in the range of about 1 $\mu$M or less. In other words, the compensation lens 36 is constructed as a weaker lens than the collimating lens 34. The ordinary artisan will readily appreciate that a relatively weak compensation lens will be most desirable because even if the compensation lens 36 itself suffers from the same amount of lateral shift as that which results from the joining of the collimating lens 34 and fiber termination 32, the reflected beam corrected by the compensation lens 36 should not be significantly affected.

Figure 3:
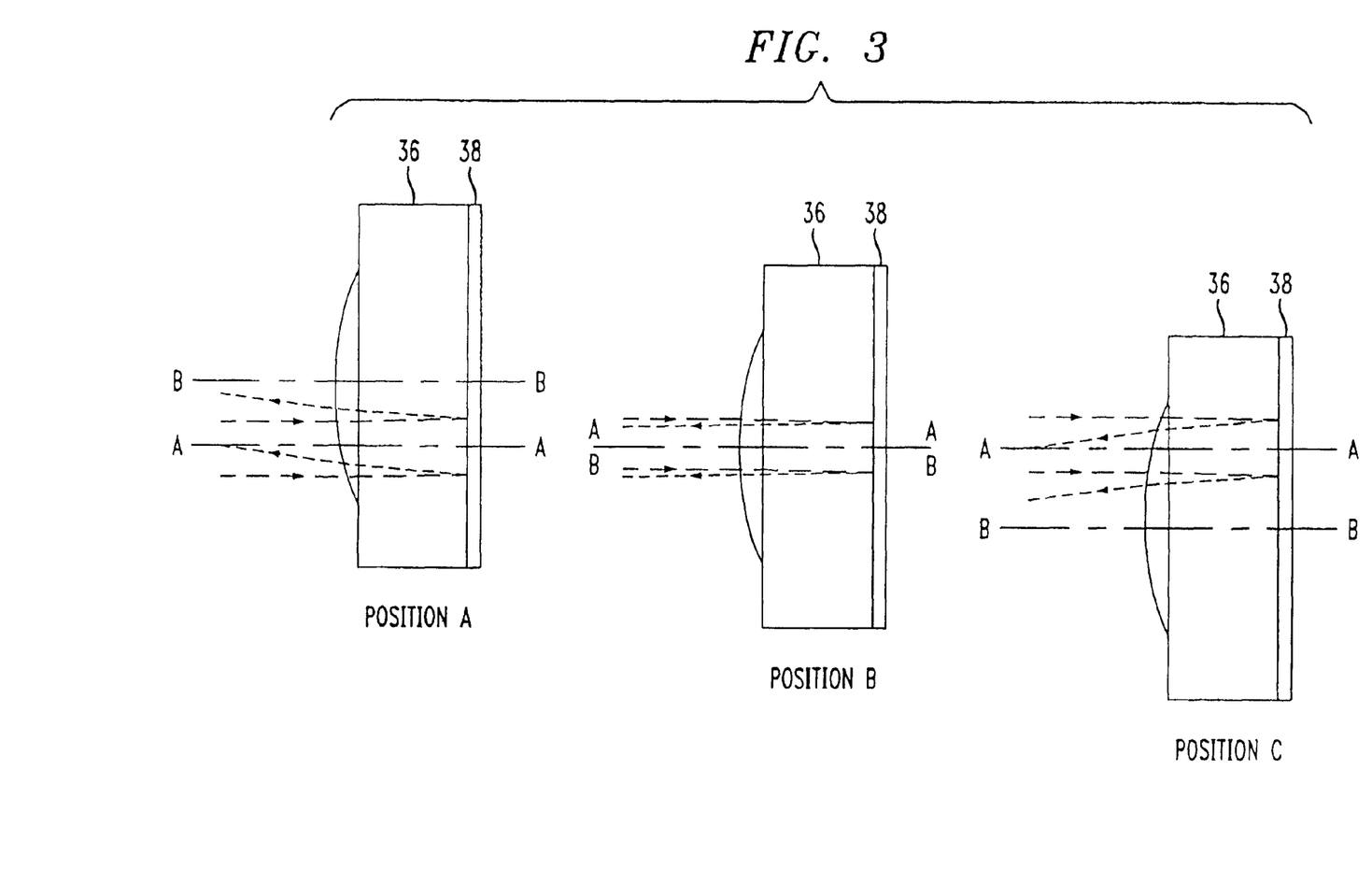
FIG. 3 schematically depicts the use of a convex-type compensation lens in various adjustment positions.

FIG. 3 schematically illustrates how a change in the lateral position of a plano-convex compensation lens 36 will affect the deflection of the reflected beam in either an upward or downward (in the figure) direction. For example, at position A, the compensation lens 36 is moved relatively upward so that the optical axis A-A of lens 34 is located below the optical axis B-B of lens 36. As a result, the incident beam is deflected upwardly causing the reflected beam to propagate angularly upward from the mirror 38. At position B, the optical axis B-B of the compensation lens 36 is substantially coincident with optical axis A-A of lens 34 so that the trajectories of the incident and reflected beams are unaffected by compensation lens 36. At position C, the compensation lens 36 is moved relatively downward so that the optical axis B-B of the compensation lens 36 is positioned below optical axis A-A of lens 34. Consequently, the incident beam is deflected downward and the reflected beam propagates angularly downward from the mirror 38.

Figure 4:
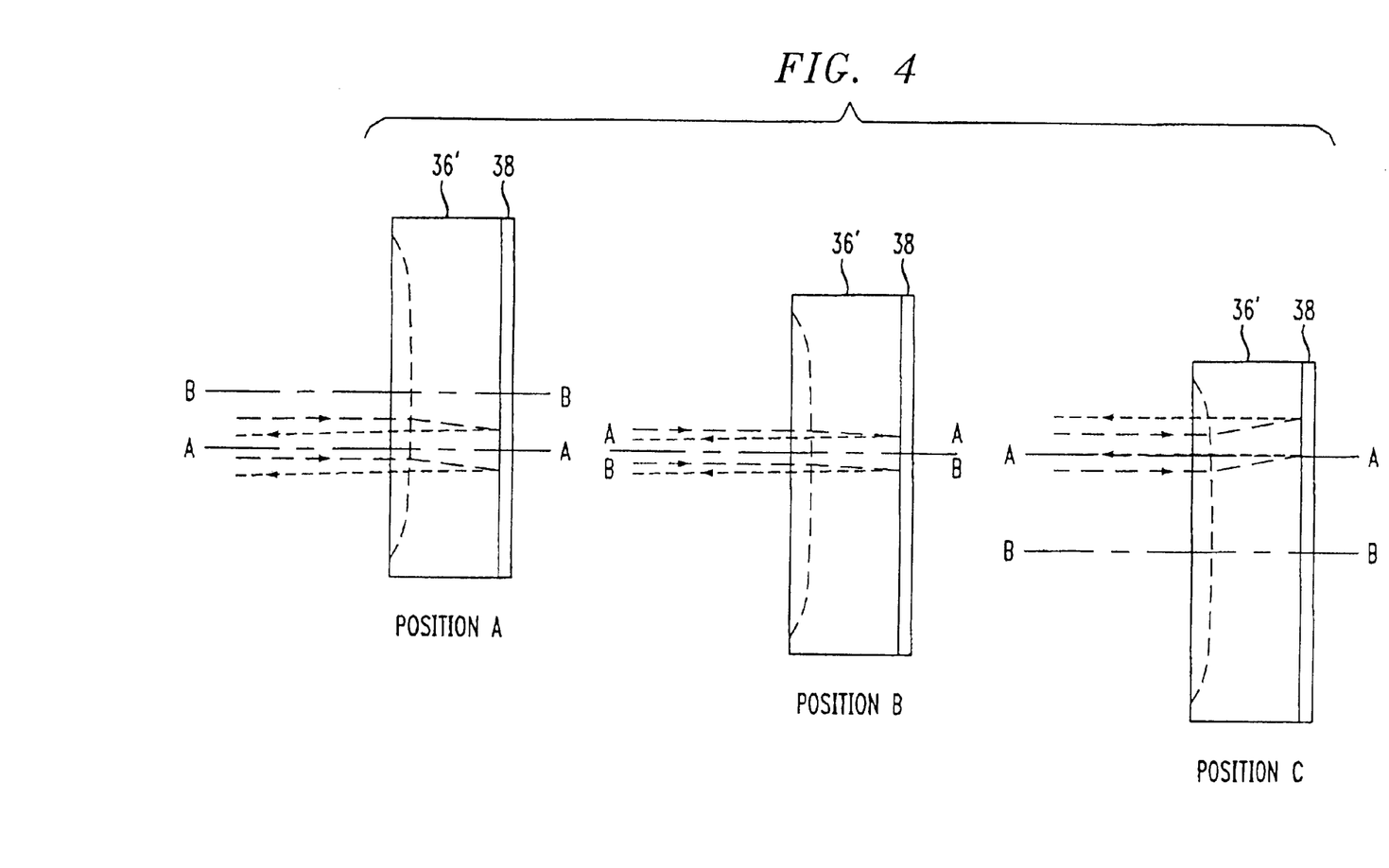
FIG. 4 schematically illustrates the use of a concave-type compensation lens in different adjustment positions.

FIG. 4 also similarly depicts how a plano-concave compensation lens 36' may be used to deflect the reflected beam. At position A, the compensation lens 36' is displaced relatively upward so that the optical axis B-B of the compensation lens 36' is disposed above optical axis A-A of lens 34; consequently, the collimated beam is deflected downward so that the reflected beam propagates angularly downward from mirror 38. At position B, the optical axis B-B of compensation lens 36' is substantially coincident with optical axis A-A of lens 34 and, as a result, the trajectories of the incident and reflected beams are not affected. But at position C, the compensation lens 36' is displaced downward so that the optical axis B-B of the compensation lens 36' is disposed below optical axis A-A of lens 34; when so arranged, the incident beam is deflected upward and the reflected beam propagates angularly upward from mirror 38.

Figure 5:
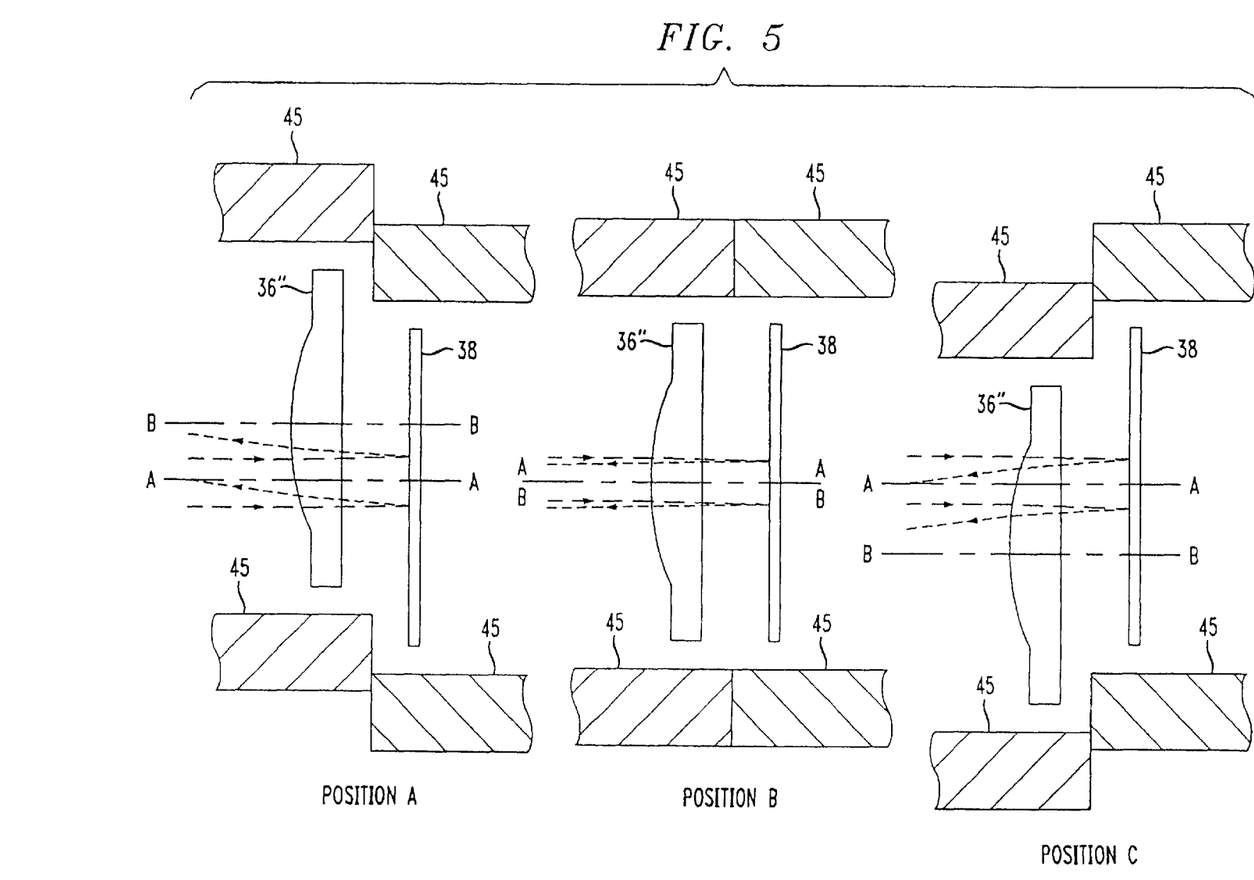
FIG. 5 schematically depicts the use of a compensation lens separate from a reflective layer of a mirror.

FIG. 5 illustrates that a compensation lens 36" separate and spaced from mirror 38 can be used just as effectively to correct the propagation path of the reflected beam. As shown, the compensation lens 36" may, for example, be housed in separate metal holders 45. In this form of the inventive arrangement, the mirror 38 is fixed in relation to the optical axis A-A of lens 34, while the compensation lens 36" is selectively moveable in a direction transverse to optical axis A-A of lens 34. With the compensation lens 36" configured as shown by way of example as a plano-convex lens, the trajectories of the incident and reflected beams for the various positions are substantially similar to those depicted in FIG. 3 where the lens 36 and mirror 38 form an integrated unit. In sum, an upward displacement of the convex-type type lens 36" (position A in FIG. 5) causes the reflected beam to propagate angularly upward from mirror 38, and a downward displacement of lens 36" (position C) causes the reflected beam to travel angularly downward from the mirror.

As previously mentioned, the optical package 30 may be constructed by placing the dual fiber termination 32 and the collimating lens 34 in separate metal holders 43, 44, and the compensation lens 36" and mirror 38 in another metal holder 45. Preferably, the dual fiber termination 32 is disposed in a metal holder 43 having a telescoping section 46 for enabling suitable adjustment of the axial distance between termination 32 and lens 34. The metal holders 43–45 may be formed of a material having thermal expansion characteristics similar to those of glass. The material may, for example, be a low expansion iron alloy including; without limitation, stainless steel and Kovar. The metal holders 43–45 are preferably cylindrical in shape and have a central bore extending therethrough. The ends of the holders 4345 should be precision-machined so that they may be joined end-to-end, after the components retained therein have been optically aligned. The holders 4345 preferably have various mounting and/or registration features for positioning the optical components therein which may be affixed to the inside walls of the holders 43–45 by the application of, for example, a bonding material such as epoxy.

The holders 43–45 may be affixed to each other using a variety of art-recognized securement techniques such, for example, as epoxy bonding, soldering and/or welding (e.g. laser welding). These techniques will, however, typically impart asymmetric forces on the holders 43–45 as they are heated and cooled non-uniformly during the securement process. These asymmetric forces cause the relative positions of the holders 43–45 to shift as the epoxy, solder, and/or weld zones solidify. It has been widely recognized that typical laser welding operations can result in a shift of 1 μM or more. As previously pointed out, such a shift can be detrimental to an optical package for reflective applications since a 1 μM shift in the mechanical alignment of adjacent holders may cause as much as a 2 μM optical misalignment of the reflective devices.

The aforementioned alignment problem can be corrected by employing the inventive method and apparatus. In accordance with the preferred method, the metal holders 43–45 containing the dual fiber termination 32, the collimating lens 34, the compensation lens 36, 36', or 36" and the mirror 38 are first brought together or stacked in end-to-end relation. Second, optical alignment of these components is performed by selective relative movement(s) of the holders 43–45 as the input/output optical signals to/from the optical package 30 are analyzed using well known techniques. Third, once the optical components have been optically aligned, the holders 43, 44 for the dual fiber termination 32 and the collimating lens 34 are attached to each other by, for example, epoxy, soldering, welding or any other known securement techniques. Fourth, optical measurement through analysis of the input/output optical signals is again performed as the holder 45 containing the compensation lens 36, 36', or 36", constructed as herein disclosed, is selectively moved transverse to the optical axis A-A of lens 34 to adjust for any shift or degradation in optical misalignment that resulted from or occurred after the preceding attachment operation. Fifth, with optical alignment once more achieved, the holder(s) 45 carrying the compensation lens 36, 36', or 36" and mirror 38 are attached to the holder 44 of the collimating lens 34. This last or final attachment step will not cause a significant shift in optical alignment because the compensation lens, as compared to the collimating lens 34, is constructed to have a relatively long focal length so that minor relative displacement—as a result of the attachment operation—of the holders 44 in a direction transverse to the optical axis A-A of lens 34 will not effect significant deviations in optical alignment.

Figure 6:
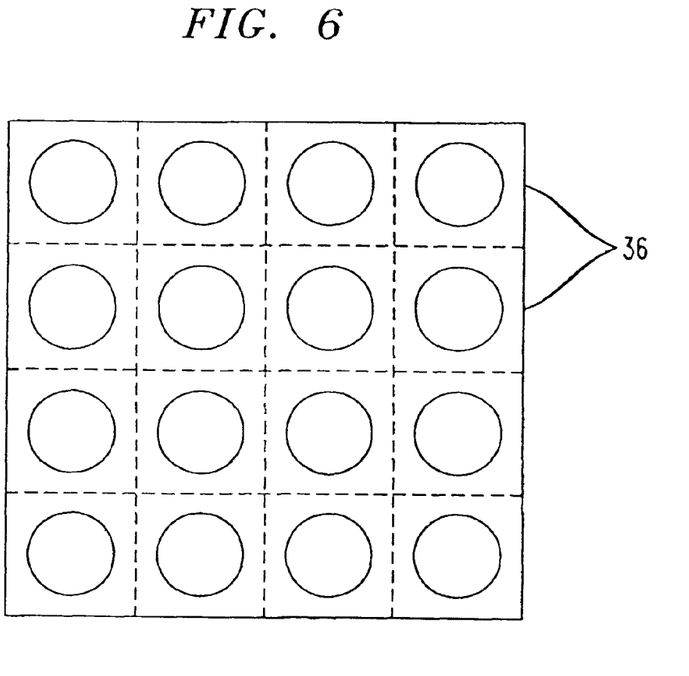
FIG. 6 is a plan view of a plurality of compensation lenses produced on a single wafer.
Figure 7:
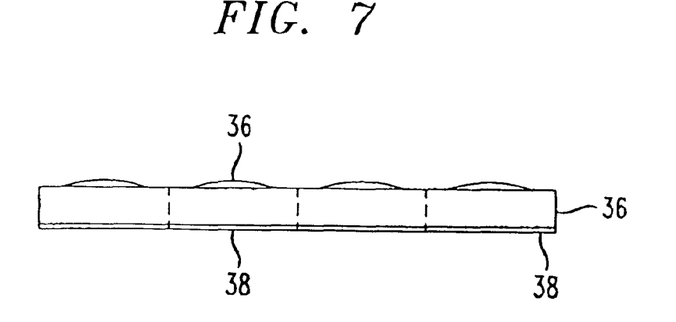
FIG. 7 is a side view of the compensation lenses wafer arrangement of FIG. 6.

It is generally contemplated and intended that the combined compensation lens and mirror units be mass produced on a single "wafer," as for example shown in FIGS. 6 and 7, although other arrangements and techniques for their fabrication are also within the scope of the invention. The array of weak compensation lenses 36 may be defined photolithographically on a substrate formed of an optical material such, for example, as silica or glass using, without limitation, Reactive Ion Etching ("RIE") techniques. Optionally, RIE techniques may also be used to place fiducials detent or registration means adjacent the lens patterns. The mirrors 38 may be formed by evaporating a reflective layer having the desired reflective properties (e.g. high or partial reflectivity) on the non-lens side of the substrate. Preferably, an anti-reflective coating is formed on the lens side of the substrate for improved optical performance. Individual compensation lens-mirror units are then obtained by cutting along the dashed lines on the "wafer" as indicated in FIG. 6.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical package capable of compensating for a shift in optical alignment of optical components of the optical package, comprising:

a dual fiber termination including a first optical fiber end portion for emitting a first optical signal axially therefrom, and a second optical fiber end portion disposed predeterminately adjacent to said first optical fiber end portion for receiving a second optical signal;

a collimating lens having an optical axis and disposed in spaced relation to said dual fiber termination for collimating and transmitting the first optical signal from the first optical fiber end portion and for converging the second optical signal at a point of convergence on the second optical fiber end portion;

a mirror spaced from said collimating lens and including a reflective layer configured and oriented for receiving the first optical signal from the collimating lens and for reflecting at least a portion of the received first optical signal toward said collimating lens along a propagation path to thereby define the second optical signal; and a compensation lens disposed between said collimating lens and said reflective layer of said mirror, said compensation lens being configured for receiving and deflecting the first optical signal from said collimating lens, having a focal length longer than a focal length of the collimating lens, and being selectively movable in an adjustment direction transverse to the optical axis to thereby adjust, by way of said selective movement, the propagation path of the reflected optical signal to align the second optical signal with the second optical fiber end portion wherein a resulting movement $d_{poc}$ of the point of convergence and said selective movement $d_{comp}$ of the compensating lens has a relationship $d_{poc} = \alpha \cdot d_{comp}$, where a magnitude of $\alpha$ is a value less than one and greater than zero, so that said second optical fiber end portion receives the second optical signal without significant alignment-related optical loss.

2. The optical package of claim 1, wherein said compensation lens comprises a plano-convex lens.

3. The optical package of claim 1, wherein said compensation lens comprises a plano-concave lens.

4. The optical package of claim 1, wherein said mirror comprises a dichroic mirror.

5. The optical package of claim 1, wherein said reflective layer is configured for reflecting substantially all of the first optical signal incident thereon.

6. The optical package of claim 1, wherein said compensation lens is disposed integrally on said mirror.

7. The optical package of claim 1, wherein said collimating lens includes at least one convex optical surface.

8. The optical package of claim 1, wherein said collimating lens comprises one of a double convex lens, a GRIN lens, and a plano-convex aspheric lens.

9. The optical package of claim 1, further comprising a first holder for retaining said dual fiber termination, a second holder for retaining said collimating lens, and a third holder for retaining said compensation lens and said mirror, and wherein said first, second and third holders are secured together to positionally fix said dual fiber termination, said collimating lens and said compensating lens and mirror relative to each other.

10. The optical package of claim 9, wherein the first, second and third holders are formed of metal.

11. The optical package of claim 10, wherein the metal is selected from a group consisting of stainless steel and Kovar.

12. The optical package of claim 1, further comprising a first holder for retaining said dual fiber termination, a second holder for retaining said collimating lens, a third holder for retaining said compensation lens, and a fourth holder for retaining said mirror, wherein said first, second and third holders are secured together to positionally fix said dual fiber termination, said collimating lens and said compensating lens and mirror relative to each other.

13. A method for making an optical package operable for compensating for a post-assembly shift in optical alignment of optical components in the package, comprising the steps of:

(a) securing nonmovably together a first holder and a second holder, the first holder carrying a dual fiber termination mounted to the first holder and formed of a first optical fiber end portion and a second optical fiber end portion, the second holder carrying a collimating lens mounted to the second holder and defining an optical axis through the collimating lens, the first and second holders being secured together so that the collimating lens is disposed for collimating a first optical signal emitted by the first optical fiber end portion and for converging a second optical signal onto the second optical fiber end portion;

(b) positionally adjusting a third holder relative to the secured-together first and second holders, the third holder carrying a mirror mounted to the third holder for reflecting, back toward the collimating lens along a propagation path, at least a portion of the first optical signal from the collimating lens to thereby define the second optical signal, the third holder further carrying a compensation lens mounted to the third holder so that the first optical signal from the collimating lens passes through the collimating lens prior to reflection by the mirror, said positional adjustment of the third holder comprising selectively moving the third holder relative to the second holder in a direction substantially transverse to the optical axis so as to adjust the propagation path of the reflected second optical signal from the mirror to align the second optical signal with and for receipt by the second optical fiber end portion without significant alignment related optical loss and thereby compensate for any post-assembly shift in optical alignment resulting from said step (a); and (c) securing nonmovably together the positionally-adjusted third holder to the second holder so as to fix the optical alignment of the second optical signal with the second optical fiber end portion and thereby avoid significant alignment-related optical loss.

14. The method of claim 13, wherein said securing steps (a) and (c) are performed using laser welding.

15. The method of claim 13, wherein said securing steps (a) and (c) are performed using soldering.

16. The method of claim 13, wherein said securing steps (a) and (c) are performed using an epoxy bonding technique.

17. The method of claim 13, wherein the compensation lens has a focal length longer than the focal length of the collimating lens.

18. A method for compensating for a post-assembly shift in optical alignment of and between optical components in an optical package, comprising the steps of:

(a) providing a dual fiber termination having a first optical fiber end portion and a second optical fiber end portion, the dual fiber termination being mounted to a first holder;

(b) providing a collimating lens mounted to a second holder, the collimating lens having an optical axis and being configured for collimating an emitted optical signal from the first optical fiber end portion and for converging a reflected optical signal onto the second optical fiber end portion;

(c) providing a mirror mounted to a third holder for reflecting at least a portion of the emitted optical signal from the collimating lens back toward the collimating lens along a propagation path to define the reflected optical signal;

(d) providing a compensation lens mounted to the third holder, and configured for deflecting the emitted optical signal as it travels from the collimating lens to the mirror such that selective movement of said third holder in a direction substantially transverse to the optical axis of the collimating lens adjusts the propagation path of the reflected optical signal so that the second optical fiber end portion received the reflected optical signal without significant alignment-related optical loss;

(e) sequentially arranging the first, second, and third holders;

(f) optically aligning the dual fiber termination, the collimating lens,, the compensation lens and the mirror by selectively moving the first, second and third holders relative to each other;

(g) attaching the first holder to the second holder so as to fix the optical alignment between the dual fiber termination and the collimating lens;

(h) selectively moving the third holder relative to the attached first and second holders in the direction substantially transverse to the optical axis of the collimating lens so as to adjust the propagation path of the reflected optical signal from the mirror toward the collimating lens to thereby compensate for any post-attachment shift in optical alignment between the dual fiber termination and the collimating lens resulting from said step (g); and (i) attaching the third holder to the second holder so as to fix the propagation path-adjusted optical alignment between the compensation lens and the collimating lens so that the reflected optical signal is received by the second fiber end portion without significant alignment-related optical loss.

19. The method of claim 18, wherein said first, second and third holders are attached to each other by laser welding.

20. The method of claim 18, wherein the first, second and third holders are attached to each other by soldering.

21. The method of claim 18, wherein the first, second and third holders are attached to each other using an epoxy bonding technique.

22. A method for compensating for a post-assembly shift in optical alignment of and between optical components in an optical package, comprising the steps of:

(a) providing a dual fiber termination having a first optical fiber end portion and a second optical fiber end portion, the dual fiber termination being mounted to a first holder;

(b) providing a collimating lens mounted to a second holder, the collimating lens having an optical axis and being configured for collimating an emitted optical signal from the first optical fiber end portion and for converging a reflected optical signal onto the second optical fiber end portion;

(c) providing a mirror mounted to a third holder for reflecting at least a portion of the emitted optical signal from the collimating lens back toward the collimating lens along a propagation path to define the reflected optical signal;

(d) providing a compensation lens mounted to a fourth holder, and configured for deflecting the emitted optical signal as it travels from the collimating lens to the mirror such that selective movement of the fourth holder in a direction substantially transverse to the optical axis of the collimating lens adjusts the propagation path of the reflected optical signal so that the second optical fiber end portion receives the reflected optical signal without significant alignment-related optical loss;

(e) sequentially arranging the first, second, fourth and third holders;

(f) optically aligning the dual fiber termination, the collimating lens, the compensation lens and the mirror by selectively moving the first, second, third and fourth holders relative to each other;

(g) attaching the first holder to the second holder so as to fix the optical alignment between the dual fiber termination and the collimating lens;

(h) selectively moving the fourth holder relative to the third holder and the attached first and second holders in the direction substantially transverse to the optical axis of the collimating lens so as to adjust the propagation path of the reflected optical signal from the mirror toward the collimating lens to thereby compensate for any post-attachment shift in optical alignment between the dual fiber termination and the collimating lens resulting from said step (g);

(i) attaching the fourth holder to the second holder of the attached first and second holders so as to fix the propagation path-adjusted optical alignment between the compensation lens and the collimating lens; and (j) attaching the third holder to the fourth holder of the attached first, second and fourth holders so that the reflected optical signal is received by the second fiber end portion without significant alignment related optical loss.

* * * * *